US009348939B2

(12) United States Patent
Andrade et al.

(10) Patent No.: US 9,348,939 B2
(45) Date of Patent: May 24, 2016

(54) WEB SITE SECTIONING FOR MOBILE WEB BROWSER USABILITY

(75) Inventors: Rajiv A. S. G. de Andrade, Campinas (BR); Lucas G. Franco, Sao Paulo (BR); Christopher A. Robbins, Monroe Township, NJ (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 13/051,767

(22) Filed: Mar. 18, 2011

(65) Prior Publication Data

US 2012/0240063 A1 Sep. 20, 2012

(51) Int. Cl.
*G06F 3/00* (2006.01)
*G06F 17/30* (2006.01)

(52) U.S. Cl.
CPC ............................... *G06F 17/30905* (2013.01)

(58) Field of Classification Search
CPC ............................................. G06F 2203/04806
USPC .......................................... 715/760, 792, 810
See application file for complete search history.

(56) References Cited

U.S. PATENT DOCUMENTS

| | | | |
|---|---|---|---|
| 6,763,388 B1 | 7/2004 | Tsimelzon | |
| 7,480,716 B2 | 1/2009 | Ehrich et al. | |
| 2002/0054090 A1 | 5/2002 | Silva et al. | |
| 2003/0095135 A1* | 5/2003 | Kaasila et al. | 345/613 |
| 2007/0110037 A1 | 5/2007 | Shin | |
| 2007/0150829 A1* | 6/2007 | Eschbach et al. | 715/781 |
| 2009/0235187 A1 | 9/2009 | Kim et al. | |
| 2009/0265611 A1 | 10/2009 | Sengamedu et al. | |
| 2010/0145924 A1 | 6/2010 | Zabramski et al. | |
| 2011/0202847 A1* | 8/2011 | Dimitrov | 715/738 |

FOREIGN PATENT DOCUMENTS

| | | |
|---|---|---|
| CN | 101620621 | 1/2010 |
| WO | WO2005062205 | 7/2005 |
| WO | WO2008098164 | 8/2008 |

OTHER PUBLICATIONS

Peifeng Xiang et al., "Effective Page Segmentation Combining Pattern Analysis and Visual Separators for Browsing on Small Screens", Proceedings of the 2006 IEEE/WIC/ACM International Conference on Web Intelligence, p. 831-840.

Xiangye Xiao et al., "Browsing on Small Displays by Transforming Web Pages into Hierarchically Structured Subpages", ACM Transactions on the Web, vol. 3, No. 1, Article 4 (Jan. 2009).

Xin Yang et al., "Enhanced Gestalt Theory Guided Web Page Segmentation for Mobile Browsing", 2009 IEEE/WIC/ACM International Conference on Web Intelligence and Intelligent Agent Technology, vol. 3, pp. 46-49 (2009).

(Continued)

*Primary Examiner* — Andrey Belousov
(74) *Attorney, Agent, or Firm* — Law Offices of Ira D. Blecker, P.C.

(57) ABSTRACT

A method of displaying web page information. The method includes dividing a web page into sections, displaying on a mobile device having a web browser the web page having the sections, panning to a web page section of interest, and zooming-in to the web page section of interest to enlarge text or images on the web page section of interest while the mobile device browser loads only content for the web page section of interest. The method is performed by one or more computing devices. Also disclosed is a computer program product for displaying web page information.

13 Claims, 3 Drawing Sheets

(56) References Cited

OTHER PUBLICATIONS

Yevgen Borodin et al., "Contex Browsing with Mobies—When Less is More". MobiSys '07 Proceedings of the 5th international conference on Mobile systems, applications and services, 2007.

Yu Chen et al., "Detecting Web Page Structure for Adaptive Viewing on Small Form Factor Devices", International Word Wide Web (WWW) Conference, p. 225-233 (2003).

Aditya Gupta; "Mobile Web: Web Manipulation for Small Displays using Multi[level Hierarchy Page Segmentation", Proceedings of the 4th International Conference on Mobile Technology, Applications and Systems (Mobility 2007), p. 599-606.

Dongsong Zhang, "Web Content Adaptation for Mobile Handheld Devices", Communications of the ACM, vol. 50 Issue 2, Feb. 2007.

* cited by examiner

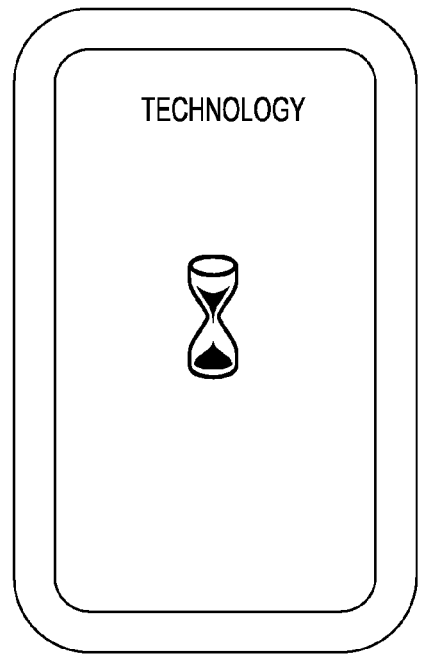
FIG. 1A
PRIOR ART
FIG. 1B
PRIOR ART
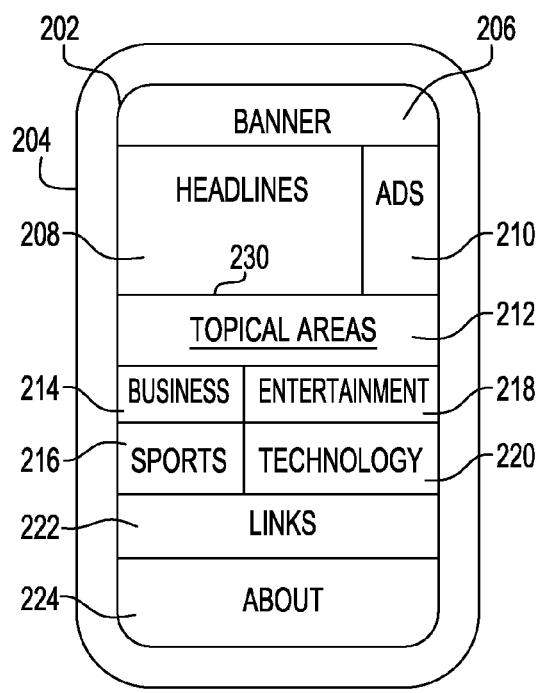
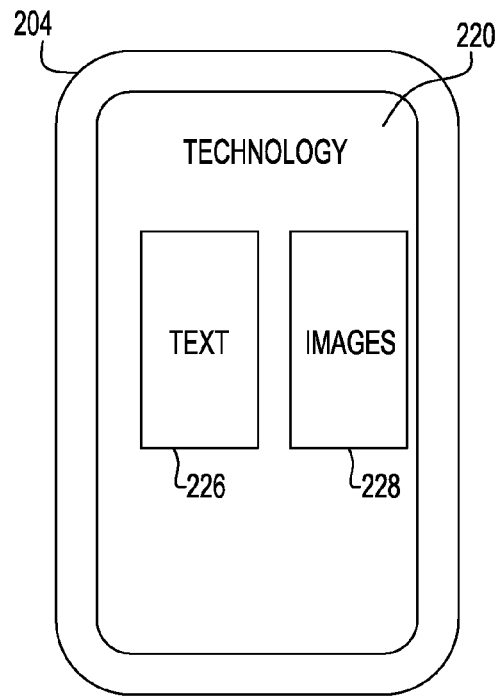
FIG. 2A
FIG. 2B

WEB SITE SECTIONING FOR MOBILE WEB BROWSER USABILITY

BACKGROUND

The present invention relates to the display of web sites by a web browser and, more particularly, relates to the display of web sites by a web browser in a mobile client wherein the web site may be sectioned and zoomed-in to provide enhanced web browser usability.

Recent mobile versions of many web browsers default to a desktop view in which web pages are loaded and rendered as they would appear in a full personal computer web browser. However, to accommodate the desktop version, these mobile web browsers zoom out to allow the entire web page to be rendered in a low screen resolution. In this zoomed-out view the user can understand the page layout, but can only read larger text such as titles and headings. The user must then use affordances, provided by the web browser user interface (UI), to zoom in and pan to sections of the page in which he or she is interested. However, once the user has zoomed in and panned to this area of interest, he or she may experience a noticeable delay while page content that will not be displayed in the section of interest is loading.

During this delay in loading page content, various visual cues may be used to indicate that page content is still being loaded and rendered. For example, the user may see a checkered gray background in areas they have zoomed in and panned to while web page content is being loaded.

Delays that result from loading non-displayed content can be especially annoying to users who frequently visit certain web sites and almost always pan or zoom to the same location. For example, consider a user who frequently visits a weather website that includes information about current weather conditions, the 5-day weather forecast, etc. If the user always pans and zooms to the 5-day forecast, the user must wait for the non-displayed content not in the selected area to load every time the user visits the website.

BRIEF SUMMARY

The various advantages and purposes of the exemplary embodiments as described above and hereafter are achieved by providing, according to a first aspect of the exemplary embodiments, a method of displaying web page information. The method includes dividing a web page into a plurality of sections; displaying on a mobile device having a web browser the web page having the plurality of sections; and responsive to input from a user, zooming-in to a web page section of interest to enlarge text or images on the web page section of interest while the mobile device browser loads only content for the web page section of interest. The method may be performed by one or more computing devices.

According to a second aspect of the exemplary embodiments, there is provided a method of displaying web page information. The method includes displaying a web page on a mobile device having a web browser; dividing a web page into a plurality of sections by the mobile device; displaying on the mobile device web browser the web page having the plurality of sections; and responsive to input from a user, zooming-in to the web page section of interest to enlarge text or images on the web page section of interest while the mobile device browser loads only content for the web page section of interest. The method may be performed by one or more computing devices.

According to a third aspect of the invention, there is provided a method of displaying web page information. The method includes dividing a web page into a plurality of sections by a web server; displaying on a mobile device having a web browser the web page having the plurality of sections; and responsive to input from a user, zooming-in to a web page section of interest to enlarge text or images on the web page section of interest while the mobile device browser loads only content for the web page section of interest. The method may be performed by one or more computing devices.

According to a fourth aspect of the invention, there is provided a computer program product for displaying web page information, the computer program product including a computer readable storage medium having computer readable program code embodied therewith. The computer readable program code includes computer readable program code configured to divide a web page into a plurality of sections; computer readable program code configured to display on a mobile device having a web browser the web page having the plurality of sections; and responsive to input from a user, computer readable program code configured to zoom-in to a web page section of interest to enlarge text or images on the web page section of interest while the mobile device browser loads only content for the web page section of interest.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 1A and 1B are prior art views of a mobile client displaying a web page wherein FIG. 1A illustrates the web page displayed in low resolution and FIG. 1B illustrates a zoomed-in portion of the web page.

FIGS. 2A and 2B illustrate a mobile client displaying a web page in an exemplary embodiment wherein FIG. 2A illustrates the web page displayed in low resolution with the web page divided into sections and FIG. 2B illustrates a zoomed-in portion of the web page.

DETAILED DESCRIPTION

Figure 3:
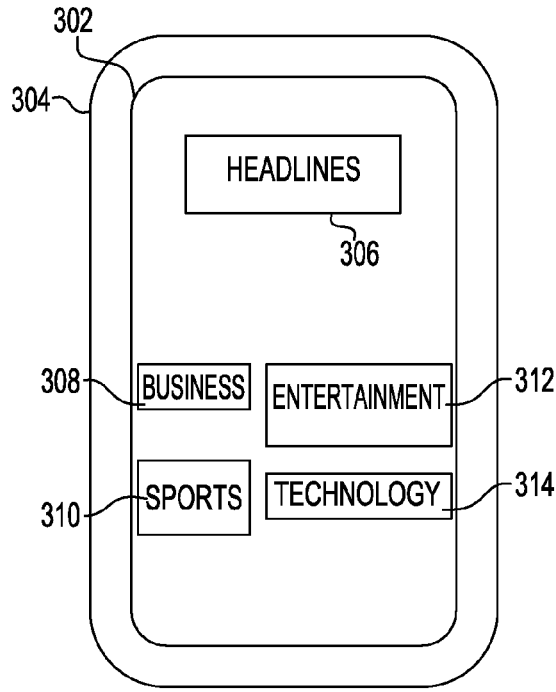
FIG. 3 illustrates another exemplary embodiment of a mobile client displaying a web page wherein the web page is divided into sections and the sections appear as thumbnails.

Referring to the Figures in more detail, and particularly referring FIGS. 1A and 1B, there is illustrated a conventional method of displaying content on a mobile client having a web browser. The content is received from a remote web server as is conventional. When a user using the web browser of the mobile client wants to view a web page, a low resolution view of the web page may be displayed to the user. In such a low resolution view, the user may be able to see the banner, headings and larger text and images but the remaining portions of the web page would be fuzzy or unreadable. As shown in FIG. 1A, items such as the "Banner", "Headlines", "Topical Areas" and "About" portions of the web page may be the only portions of the web page that are clearly visible. If the user is interested in a particular portion of the web page, the user would pan over and then zoom-in on the web page. As shown in FIG. 1B, the user has panned over and zoomed-in on the "Technology" topical area. However, due to the fact that the web browser has to load in page content relating to the "Banner", "Headlines" and other "Topical Areas" before page content relating to the "Technology" topical area can be displayed, the user is left with the "Technology" topical area heading and blank space, or perhaps a visual cue such as an hourglass indicating that page content is loading. This delay in loading page content for the "Technology" topical area can be annoying and time-wasting for the user of the mobile client.

The exemplary embodiments describe a mechanism for preventing delays when web browsers in mobile clients load web page content that is not required to render areas to which a user has zoomed in and panned to. Mobile clients may include but not be limited to cell phones, personal digital assistants, smart phones and other similar wireless devices. The core idea of the exemplary embodiments is to have predefined sections of the web page that can be requested individually. While the exemplary embodiments have the greatest applicability to mobile devices because of limitations relating to network performance, screen size and screen limitation, the exemplary embodiments may also be applicable to laptop computers and desktop computers.

Referring to FIG. 2A, there is shown a web page 202 displayed in a web browser of a mobile client 204. The layout of the web page 202 is similar to the layout of the web page displayed in FIG. 1 except that the web page 202 displayed in FIG. 2A has been divided into a plurality of discrete sections. There is a "Banner" section 206, "Headlines" section 208, "Ads" section 210, "Topical Area" section 212, "Business" topical area section 214, "Sports" topical area section 216, "Entertainment" topical area section 218, "Technology" topical area section 220, "Links" section 222 and "About" section 224. The foregoing are just an exemplary list of possible sections on a web page for purposes of illustration only and are not meant to be an exclusive or limiting list. If it is desired to learn more about the "Technology" topical area section 220, the user may pan over to anywhere within the "Technology" topical area section 220 and zoom-in using the controls and features of the mobile client.

"Pan" means to move a cursor over a section of interest, touching a portion of the screen for a mobile client with a touch screen or other means to select a section of interest. "Zoom-in" means to enlarge the section of interest for viewing using the controls and features of the mobile client.

Once zoomed-in, the "Technology" topical area section 220 appears as shown in FIG. 2B with renderable areas of text 226 and/or images 228. Since the web page 202 was divided into discrete sections, when the "Technology" topical area section 220 is selected by panning to it and zooming-in, only the "Technology" topical area section 220 loads in the web browser of the mobile client 204. The loading of the "Technology" topical area section 220 occurs without the delay experienced by the prior art because only the "Technology" topical area section 220 is loaded in the mobile client web browser at this time.

It is noted in FIG. 2A that each of the discrete sections are demarcated by lines 230. In an exemplary embodiment, these lines are for illustration purposes only and may not appear in the actual web page 202. In another exemplary embodiment, these lines 230 may actually appear when the web page 202 is divided so as to indicate the discrete sections of the web page 202. Further, each of the sections may have its own uniform resource locator (URL) which may have the coordinates of each section. The URL may be a dynamic URL that changes each time the web page is divided.

In a further exemplary embodiment, the web page may be rendered as thumbnails. That is, sections of the web page may be divided and rendered as thumbnail images of the sections of the web page: Thumbnail images in computing jargon are small images that may be expanded. Referring to FIG. 3, the mobile client 304 has displayed therein a web page 302 being divided into thumbnail images of the "Headlines" section 306, "Business" section 308, "Sports" section 310, "Entertainment" section 312 and "Technology" section 314. The thumbnails may be of various sizes. Again, the foregoing are just an exemplary list of possible thumbnail sections on a web page for purposes of illustration only and are not meant to be an exclusive or limiting list.

The showing of web pages as thumbnails may be a user interface option selected by the user or it may be determined by the browser based on the availability of sectioning information.

When a user pans over to one of the sections and zooms-in, the section would load within the browser of the mobile client 304 with minimal delay as described previously with reference to FIG. 2B.

There are a number of exemplary embodiments for establishing these predefined sections shown in FIGS. 2A and 3, categorized as follows:

Client-side Dynamic
Server-side Manual (Assisted)
Server-side Dynamic

In the client-side dynamic exemplary embodiment, the mobile client web browser works independently from a remote server to analyze web pages when they are first loaded completely, and dynamically sections them. The web browser then uses data it has stored about these sections to only load resources required to render the area currently zoomed in and panned to by the user on subsequent visits.

Conversely, in the server-side exemplary embodiments, the servers maintain the sectioning information for their hosted web pages, and are responsible for sending only the resources required to properly render the area currently being shown on the device screen. The server-side exemplary embodiments may enable maintaining the resources required for previously requested web page sections, and then allowing direct access to these resources via dynamically generated URLs.

The server-side exemplary embodiments differ in the way sections are determined. In the server-side manual exemplary embodiment, the page authors predetermine the sections to send. In the server-side dynamic exemplary embodiment, the mobile client sends information about its rendering capabilities and current state, such as its screen size, current pan area coordinates and current zoom ratio, which the server then uses to determine sections that are appropriate for that mobile client.

The client-side dynamic exemplary embodiment and the server-side dynamic exemplary embodiment allow for arbitrary sectioning of web pages by dynamically determining the required resource reference (e.g., URLs) contained in any given rendered portion of the web page.

In all of the exemplary embodiments previously described, the mobile client web browser is able to enhance the user's experience when selecting a section of a web page to pan and zoom to by reducing the page load time. Furthermore, the user could request that this selection be maintained for future visits—either as a default pan and zoom when the user returns to the page, or as a "favorites" link that includes both the URL and selected section information.

Figure 4:
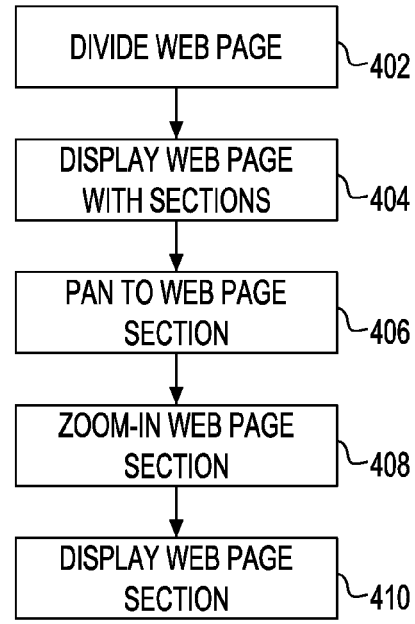
FIG. 4 is a flow chart illustrating a method according to the exemplary embodiments.

The methodology of the exemplary embodiments is illustrated in FIG. 4. The web page may be divided into sections according to the exemplary embodiments, box 402. The sectioned web page may be displayed on the mobile client web browser, box 404. Thereafter, the user may pan to the web page section of interest, box 406, and then the user may zoom-in to the web page section of interest, box 408. In practice, the user may simply select the web page section of interest and then zoom-in in a single step, encompassed by box 408. The web page section of interest is then displayed on the mobile client web browser, box 410. The web page section of interest is loaded in the mobile client web browser with minimal delay because only the web page section of interest is loaded and not the entire web page.

The client-side dynamic exemplary embodiment is the least complex, but most restricted. In this approach, the mobile client web browser works independently from the server to identify and request only those resources located in the zoomed in and panned to section of the page. This exemplary embodiment would be restricted to the return visit scenario, in which the user is returning to a previously visited page. This restriction is based upon the mobile client web browser needing at least one initial rendering of the entire web page to determine in which sections various content would be located after all images have been loaded and placed, and all dynamic behavior has occurred. After this initial rendering, the mobile client web browser can determine which content would be visible to the user when the user returns to the page and zooms into a section. The primary benefit of this approach is that it works with web sites and pages as they currently exist, with no need to modify the web server (i.e. HTTP server) or individual web pages.

Figure 5:
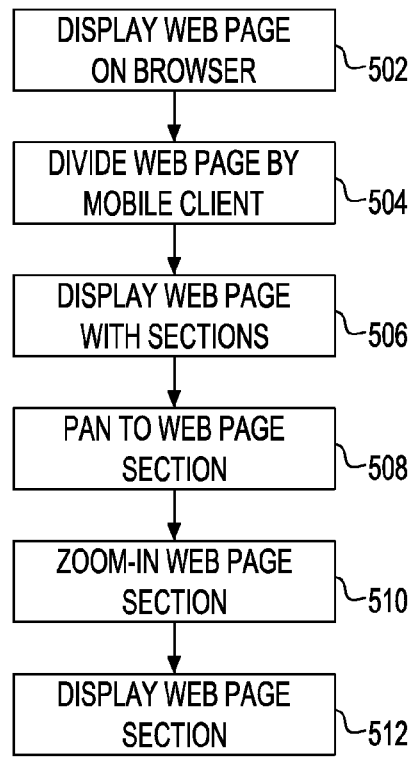
FIG. 5 is a flow chart illustrating a method according to an exemplary embodiment.

The methodology of the client-side dynamic exemplary embodiment is illustrated in FIG. 5. The web page is first displayed on the mobile client web browser, box 502. The web page may then be divided into sections by the mobile client, box 504. The sectioned web page may then be displayed on the mobile client web browser, box 506. Thereafter, the user may pan to the web page section of interest, box 508, and then the user may zoom-in to the web page section of interest, box 510. In practice, the user may simply select the web page section of interest and then zoom-in in a single step, encompassed by box 510. The web page section of interest is then displayed on the mobile client web browser, box 512. The web page section of interest is loaded in the mobile client web browser with minimal delay because only the web page section of interest is loaded and not the entire web page.

In the server-side manual exemplary embodiment, web page sections may be predetermined by the page authors and developers, and maintained on the remote web server. The web server may also maintain knowledge of which page resources are required to render each section. The mobile client web browser may then automatically adjust user web page section selections to the nearest predetermined section defined on the server. Some additional cooperation from the mobile client web browser may also be required, such as connecting to a special server port to access the sectioning function, and using an additional protocol for sharing section selection and related information.

In addition, the divided sections of the web page may each be shown as a small thumbnail as shown in FIG. 3. The size of the thumbnails may be manipulated by the web server so that they may appear larger if there is new content or updates since the last viewing of the section. As another example, if the thumbnail represents the user's email account, the thumbnail may appear larger when new email arrives. This preemptively increases the screen readability and makes the use of the screen area more efficient.

One benefit to using this exemplary embodiment is that letting authors and developers declare the sections allows for more intelligent sectioning of the web page. Thus, authors can declare sections based upon their knowledge of the overall page layout, intended areas of interaction, hierarchy of usefulness, etc. Mobile client web browsers could then take advantage of these predefined sections to provide a browsing mode in which rectangles outline named sections of the page as shown in FIG. 2A, and allow users to easily select a section based upon its author-specified purpose. Another benefit to this exemplary embodiment is improved performance over the client-side method, because the sections and their required content are all determined ahead of time. An optional assisted aspect of this exemplary embodiment may be the inclusion of a toolkit for aiding web page authors and developers in specifying the page sections, such as a graphical user interface in which the author can drag squares over rendered versions of the page to select sections.

Figure 6:
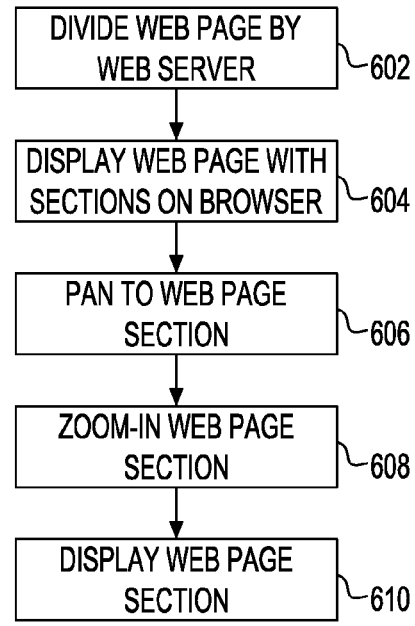
FIG. 6 is a flow chart illustrating a method according to another exemplary embodiment.

The methodology of the server-side manual exemplary embodiment is illustrated in FIG. 6. The web page may be divided into sections by the remote web server, box 602. The sectioned web page may be displayed on the mobile client web browser, box 604. Thereafter, the user may pan to the web page section of interest, box 606, and then the user may zoom-in to the web page section of interest, box 608. In practice, the user may simply select the web page section of interest and then zoom-in in a single step, encompassed by box 608. The web page section of interest is then displayed on the mobile client web browser, box 610. The web page section of interest is loaded in the mobile client web browser with minimal delay because only the web page section of interest is loaded and not the entire web page.

In the server-side dynamic exemplary embodiment, the mobile client web application may provide additional information to the web server when requesting web pages, including the device's screen resolution and its current zoom and pan state. The web server may then use this additional information to locally simulate how the page would be rendered on the mobile client. The local simulation is performed on the server to mimic what would be rendered in a panned and zoomed section of the mobile client browser. The mobile client browser needs to provide resolution information so that the server can properly apply pans and zooms subsequently requested by the mobile client browser. Using this simulated rendering, the server may determine what content would appear in the section of the page resulting from the provided zoom and pan state. The server may then send back to the mobile client web browser only the resources required to render the selected section. This exemplary embodiment works best with the assumption that most, if not all, of the request web page's resources are located on the same web server as the page, and, thus, the local simulated rendering of the page only requires local resources.

Figure 7:
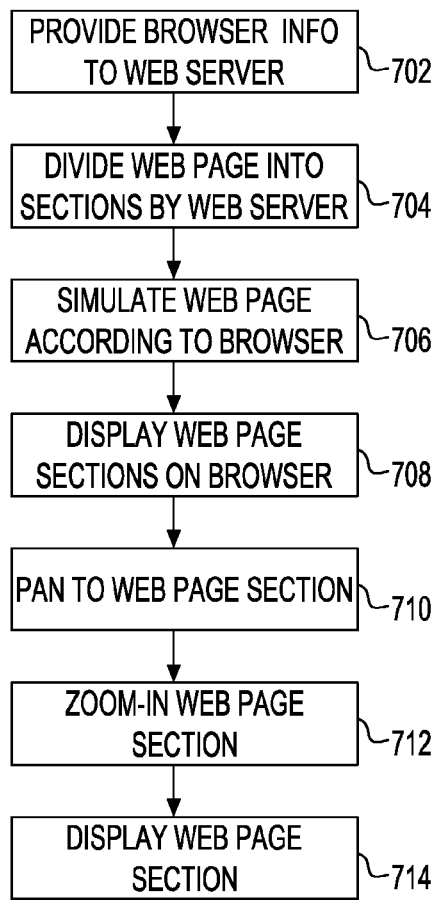
FIG. 7 is a flow chart illustrating a method according to yet another exemplary embodiment.

The methodology of the server-side dynamic exemplary embodiment is illustrated in FIG. 7. The mobile client provides to the remote server information regarding the mobile client web browser, box 702. This information may include the mobile client screen resolution, the pan and zoom state and perhaps other information as well. The web page may be divided into sections by the remote web server, box 704. The remote server may then simulate the web page for viewing on the mobile client web browser using the information the remote server received from the mobile client web browser, box 706. The simulated and sectioned web page may be displayed on the mobile client web browser, box 708. Thereafter, the user may pan to the web page section of interest, box 710, and then the user may zoom-in to the web page section of interest, box 712. The web page section of interest is then displayed on the mobile client web browser, box 714. The web page section of interest is loaded in the mobile client web browser with minimal delay because only the web page section of interest is loaded and not the entire web page.

The exemplary embodiments may require some customization to an existing mobile client web browser. Existing web browsers allow such customization through the creation of plug-ins or extensions. Plug-ins and extensions enable the customizing or extending the functionality of an application. Plug-ins and extensions, in general, are in common use today. New plug-ins and extensions for the exemplary, embodiments may be conveniently developed and written by a person skilled in the art.

For the client-side exemplary embodiment, a browser plug-in may be implemented to section loaded web pages. Upon identifying the sections into which a given web page should be divided, this plug-in may identify the resources required to populate each section via monitoring information recorded while rendering the page. The monitoring function may be another component included with the plug-in. The sectioning and resource information for each page is then maintained in the existing browser cache, along with information about the last section viewed by the user. When a sectioned page is then revisited, the cache is interrogated, the user is returned to the section they had last zoomed and panned to, and only the resources contained in that section are retrieved.

For both server-side exemplary embodiments, browser plug-ins are needed to process sectioning information being provided by the web server. However, the server-side exemplary embodiments primarily depend on cooperative changes to the web servers being accessed. A web application layer may need to be introduced on these servers to process requests from mobile client web browsers running plug-ins that indicate support for sectioning.

For the server-side assisted exemplary embodiment, the web application layer responds to full page requests with only predetermined page section information. The mobile client plug-in uses this information to visually layout and label the selectable areas for the requested page. When the user then selects one of these predetermined sections, the plug-in sends a subsequent request identifying the selected section to the web application. The web application then returns only the contents and resources required to render that section. In addition, the plug-in may cache sectioning information and the last section selected for each page visited in this manner.

The server-side dynamic exemplary embodiment plug-in differs by the mobile client initially sending browser and mobile client attribute information when the mobile client web browser requests a full page. The web server then uses this information to dynamically determine page sections that are customized for the target mobile client. The server then responds with only the sectioning information, and processing proceeds as described in the server-side assisted exemplary embodiment.

Figure 8:
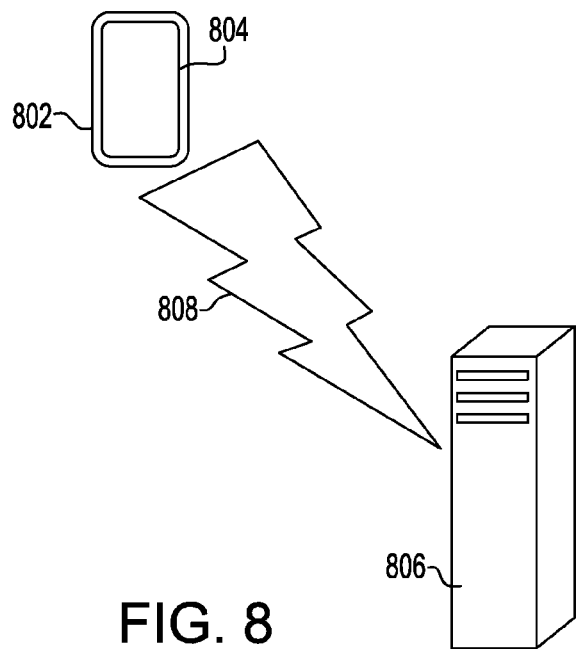
FIG. 8 illustrates a mobile client in its environment.

Referring to FIG. 8, the hardware environment in which exemplary embodiments of the invention may be executed illustratively incorporates a mobile client 802 having a web browser function 804 in wireless communication 808 with a web server 806. Not shown in FIG. 8 are conventional components such as communication stations, networks, gateways and web proxies through which the mobile client 802 may communicate with web server 806.

Figure 9:
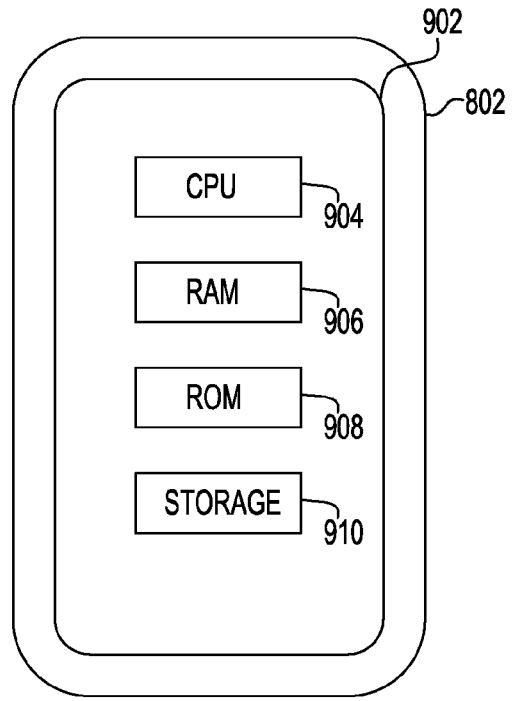
FIG. 9 illustrates a hardware environment of the mobile client.

FIG. 9 is a block diagram that illustrates one exemplary hardware environment of the mobile client 802. The mobile client 802 may be implemented using one or more computer devices 902 comprised of central processing unit (CPU) 904, random access memory (RAM) 906, read-only memory (ROM) 908 and other components. Resident in the computer device 902 may be a storage device 910 of some type such as a hard disk drive, flash drive or other storage device.

Web server 806 may have similar components.

Generally speaking, the software implementation of the exemplary embodiments is tangibly embodied in a computer-readable medium such as one of the storage devices 910 mentioned above. The computer-readable medium comprises instructions which, when read and executed by a CPU such as the CPU 904 of the computer device 902 causes the computer device such as computer device 902 to perform the steps necessary to execute the steps or elements of the exemplary embodiments. In other aspects of the exemplary embodiments, portions of the software implementation may reside in a computer readable medium in the web server 806.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/ Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/ or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of displaying web page information comprising:

retrieving a web page by a web server from a website;

dividing the web page having viewable content comprising text and images into a plurality of contiguous sections by the web server, each of the plurality of divided sections comprising viewable content of text and at least one image as a subset of the viewable content comprising text and images of the web page, the plurality of divided sections including web page section information for each of the plurality of divided sections, wherein the plurality of divided sections are thumbnail image headings that are descriptive of the text and/or images contained within the plurality of divided sections;

downloading the web page section information by a mobile device web browser for each of the plurality of contiguous divided sections without downloading the undivided web page by the mobile device web browser;

storing the web page section information for each of the plurality of divided, contiguous sections by the mobile device web browser;

displaying on a mobile device having a web browser the retrieved web page divided into the plurality of divided, contiguous sections, only a portion of the viewable content of each of the plurality of divided sections being displayed on the mobile device; and responsive to input from a user, zooming-in to one of the plurality of divided sections by selecting any part of the one of the plurality of divided sections to display and enlarge the text and the at least one image only from the one divided section by the mobile device web browser requesting the one divided section from the web server and responsive to the mobile device web browser request, the mobile device web browser downloading resources only from the web server to render only the one divided section, the mobile device web browser loading only the resources from the web server to reveal, display and enlarge only the viewable content of the text and the at least one image from the one divided section;

wherein the method is performed by one or more computing devices.

2. The method of claim 1 wherein the web server is remote from the mobile device.

3. The method of claim 2 further comprising:

providing mobile device web browser information to the web page server;

simulating by the web server the web page according to the mobile device web browser information, the simulated web page being divided into the plurality of divided sections and displayed on the mobile device web browser.

4. The method of claim 1 further comprising maintaining the one divided section for future viewing on the mobile device web browser.

5. The method of claim 4 wherein the maintaining is performed by the mobile device web browser.

6. The method of claim 4 wherein the maintaining is performed by the web page server.

7. The method of claim 4 wherein the maintaining comprises saving the one divided section as a favorites link including a uniform resource locator (URL) for the one divided section.

8. A method of displaying web page information comprising:
   displaying a web page having viewable content comprising text and images on a mobile device having a web browser;
   dividing the web page into a plurality of contiguous sections by the mobile device, each of the plurality of divided sections comprising viewable content of text and at least one image as a subset of the viewable content comprising text and images of the web page, wherein the plurality of divided sections are thumbnail image headings that are descriptive of the text and/or images contained within the plurality of divided sections;
   identifying by the mobile device the resources required to populate each divided, contiguous section of the web page;
   storing the resources to populate each divided, contiguous section of the web page by the mobile device;
   displaying on the mobile device web browser the displayed web page divided into the plurality of divided, contiguous sections, only a portion of the viewable content of each of the plurality of divided sections being displayed on the mobile device; and
   responsive to input from a user, zooming-in to one of the plurality of divided sections by selecting any part of the one of the plurality of divided sections to display and enlarge the text and the at least one image only from the one divided section by the mobile device populating the zoomed-in one divided section with the resources for the one divided section previously stored by the mobile device, the mobile device browser loading only the resources to display and enlarge only the viewable content of the text and the at least one image from the one divided section;
   wherein the method is performed by one or more computing devices.

9. The method of claim 8 further comprising maintaining the one divided section for future viewing on the mobile device web browser.

10. A computer program product for displaying web page information, the computer program product comprising:
    a nontransitory computer readable storage medium having computer readable program code embodied therewith, the computer readable program code comprising:
    computer readable program code configured to retrieve a web page by a web server from a web site;
    computer readable program code configured to divide by the web server the web page having a viewable content comprising text and images into a plurality of divided, contiguous sections, each of the plurality of divided sections comprising viewable content of text and at least one image as a subset of the viewable content comprising text and images of the web page, the plurality of divided sections including web page section information for each of the plurality of divided sections, wherein the plurality of divided sections are thumbnail image headings that are descriptive of the text and/or images contained within the plurality of divided sections;
    computer readable program code configured to download the divided web page section information by a mobile device web browser for each of the plurality of divided, contiguous sections without downloading the undivided web page by the mobile device web browser;
    storing the divided web page section information for each of the plurality of divided, contiguous sections by the mobile device web browser;
    computer readable program code configured to display on a mobile device having a web browser the retrieved web page divided into the plurality of divided, contiguous sections, only a portion of the viewable content of each of the plurality of divided sections being displayed on the mobile device; and
    responsive to input from a user, computer readable program code configured to zoom-in to one of the plurality of divided sections by selecting any part of the one of the plurality of divided sections, the mobile device web browser downloading resources only from the web server to render only the one divided section to display and enlarge the text and the at least one image only from the one divided section while the mobile device browser loads only the resources to display and enlarge only the viewable content of the text and the at least one image from the one divided section.

11. The computer program product of claim 10 wherein the computer readable program code configured to divide a web page is performed by a web server remote from the mobile device.

12. The computer program product of claim 10 further comprising:
    computer readable program code configured to provide mobile device web browser information to the web page server;
    computer readable program code configured to simulate by the web server the web page according to the mobile device web browser information, the simulated web page being divided into the plurality of sections and displayed on the mobile device web browser.

13. A computer program product for displaying web page information, the computer program product comprising:
    a nontransitory computer readable storage medium having computer readable program code embodied therewith, the computer readable program code comprising:
    computer readable program code configured to display a web page having viewable content comprising text and images on a mobile device having a web browser;
    computer readable program code configured to divide the web page into a plurality of contiguous sections by the mobile device, each of the plurality of divided sections comprising viewable content of text and at least one image as a subset of the viewable content comprising text and images of the web page, wherein the plurality of divided sections are thumbnail image headings that are descriptive of the text and/or images contained within the plurality of divided sections;
    computer readable program code configured to identify by the mobile device the resources required to populate each divided, contiguous section of the web page;
    computer readable program code configured to store the resources to populate each divided, contiguous section of the web page by the mobile device;

computer readable program code configured to display on the mobile device web browser the displayed web page divided into the plurality of divided, contiguous sections, only a portion of the viewable content of each of the plurality of divided sections being displayed on the mobile device; and responsive to input from a user, computer readable program code configured to zoom-in to one of the plurality of divided sections by selecting any part of the one of the plurality of divided sections to display and enlarge the text and the at least one image only from the one divided section by the mobile device populating the zoomed-in one divided section with the resources from the one divided section previously stored by the mobile device, the mobile device browser loading from the web server only the resources to display and enlarge only the viewable content of the text and the at least one image from the one divided section.

\* \* \* \* \*